United States Patent [19]

Drushel

[11] 4,443,681

[45] Apr. 17, 1984

[54] ELECTRIC DISCHARGE MACHINE AUTOMATIC RELAY CONTROL

[75] Inventor: Robert W. Drushel, Farmington Hills, Mich.

[73] Assignee: Ex-Cell-O Corporation, Troy, Mich.

[21] Appl. No.: 298,450

[22] Filed: Sep. 1, 1981

[51] Int. Cl.³ .............................................. B23P 1/02
[52] U.S. Cl. .................................. 219/69 C; 219/69 P
[58] Field of Search ................ 219/69 C, 69 M, 69 P; 307/510, 517, 518; 328/127, 20

[56] References Cited

U.S. PATENT DOCUMENTS

| | | | |
|---|---|---|---|
| 3,623,148 | 11/1971 | Berghausen | 219/69 P X |
| 3,764,927 | 10/1973 | Allinger et al. | 328/20 X |
| 3,996,445 | 12/1976 | Wohlabaugh | 219/69 C |
| 4,292,490 | 9/1981 | Bell, Jr. et al. | 219/69 P |

Primary Examiner—B. A. Reynolds
Assistant Examiner—C. M. Sigda
Attorney, Agent, or Firm—John C. Evans

[57] ABSTRACT

A control system for electronic discharge machining includes an automatic relay control and a current cutoff control of particular interest. The automatic relay control controls the energy level of machining pulses as a step function of machining cycle period by cutting in or out resistors in a power circuit through the machining gap. Higher frequency pulses are held to a lower current level to avoid power transistor overload. The relay control circuit includes multivibrators, energized at progressively higher values of pulse period by the counters, and an output circuit for each multivibrator which controls one of the relays which vary the gap circuit resistance. The relay control circuit also includes a threshold responsive circuit which senses any change in the several relay controlling output signals and acts to interrupt machining pulses briefly to allow time for relay operation. The current cutoff control circuit detects abnormally low voltage across the machining gap and reduces gap discharge energy level. Pulses referred to as "probe pulses" replace the normal master pulses to control gap discharge time duration and time spacing. A logic circuit controls probe pulse duration relative to master pulse duration. It provides for further lowering probe pulse energy by squelching probe pulses periodically if the master pulse period is below a certain time.

4 Claims, 7 Drawing Figures

ELECTRIC DISCHARGE MACHINE AUTOMATIC RELAY CONTROL

SUMMARY OF THE INVENTION

This invention is directed to improvements in the control of electric discharge machining apparatus, commonly called EDM machines. As is well known, such machines erode or remove material from a workpiece by rapidly repeated electrical discharges between a tool and the workpiece. The process is important because of its adaptability to forming involved shapes and its success with very hard materials.

Briefly, a typical EDM machine comprises a support for a workpiece which is immersed in a dielectric liquid. A head with servo means for moving it feeds the cutting electrode or tool to the workpiece. A power output control transmits short-duration pulses from a D.C. power source to the tool and workpiece, thus effecting discharges across the gap between them which erode the workpiece. The servo is controlled to maintain a very small gap. The power output control responds to triggering pulses fed from an adjustable pulse generator. The frequency and duration of pulses, and the energy in the discharges, are variable to meet the requirements of the job.

It is important that expensive EDM machines operate as efficiently and swiftly as possible. It is even more important to avoid damage to the tool or workpiece resulting from a short circuit between them. Such short circuits may result from accumulation of chips in the gap. They cause local heating which may ruin both the workpiece and the tool. EDM machines normally include means responsive to such conditions to shut off or reduce power and to reverse tool feed temporarily to avoid such damage.

This invention is directed to improvement in EDM control for better ease of control and speed and flexibility of operation, and to avoid damage from short circuits. More particularly, it relates to automatic relay control circuits which act to measure the period of the machining cycle, control relays to vary current level at the machining gap, and generate control signals for use with other system components for optimum EDM processing. The nature of the improvements will be clear to those skilled in the art from the detailed description and drawings of the preferred embodiment.

THE DRAWINGS

DETAILED DESCRIPTION

Figure 1:
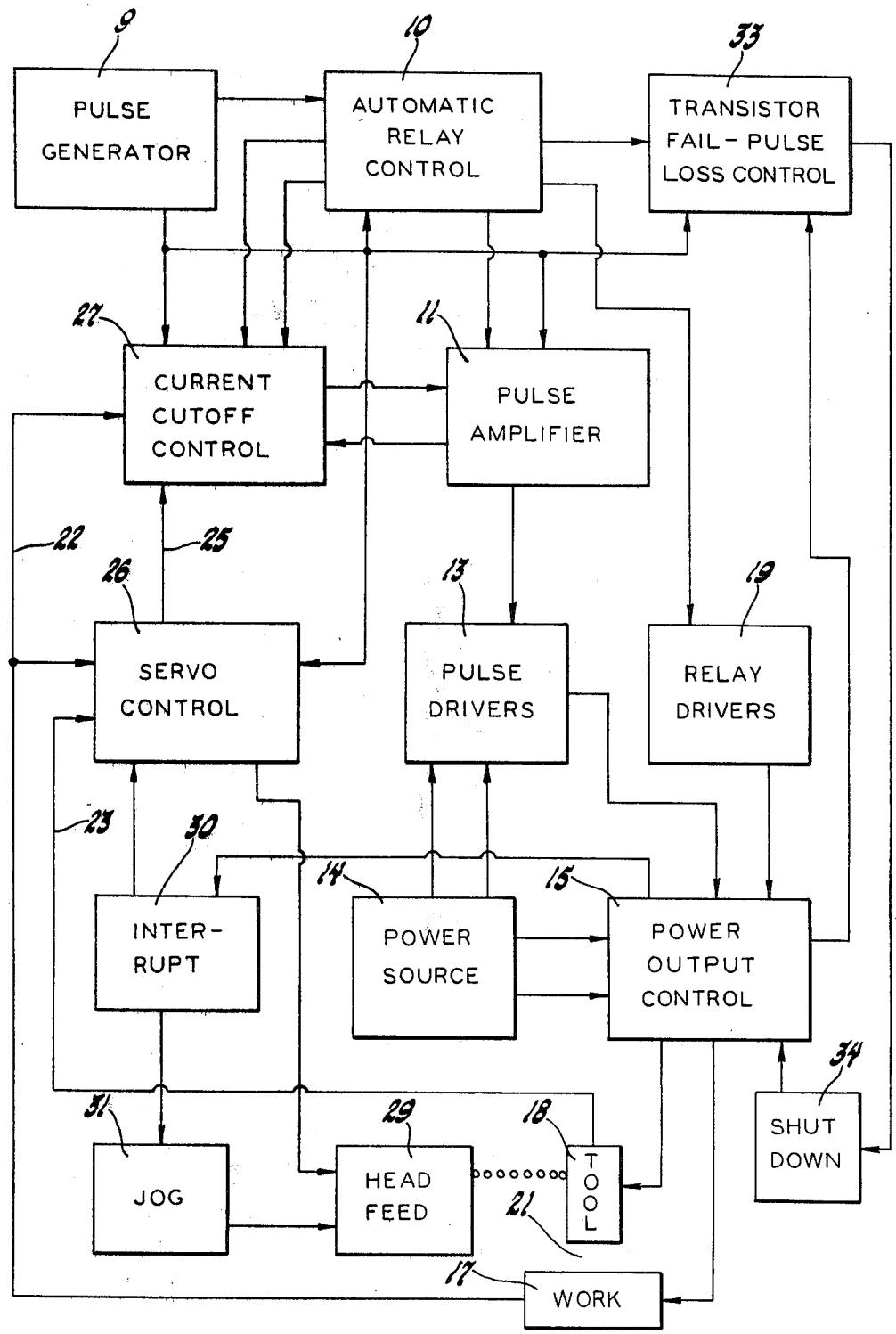
FIG. 1 is a block diagram of the EDM control system.

General Introduction (FIG. 1)

A pulse generator 9 provides various timing pulses to other elements of the system, including a master pulse which determines the frequency and duration of the power pulses. An automatic relay control 10 generates outputs responsive to the period of the master pulse. A pulse amplifier 11 responds to the master pulse to energize pulse drivers 13. These drivers transmit power from a source 14 to turn on power output transistors in a power output control 15. The power output control delivers D.C. pulses to the workpiece 17 and tool 18. The energy level of the pulses is controlled by resistor banks in the power output control inserted into the circuit by relays energized by relay drivers 19, which are in turn controlled by signals from the relay control 10.

The emf across the tool-workpiece gap 21 is transmitted through lines 22, 23 and 25 to a servo control 26 and the current cutoff control 27. The current cutoff control also receives the master pulse from the pulse generator 9 and control signals from the relay control 10. It acts through the pulse amplifier 11 to control power feed to the gap in the event of abnormal conditions.

The servo control 26 may incorporate an electrohydraulic valve controlling a cylinder in the head feed 29, which is mechanically connected to the tool 18. The servo controlled feed may be interrupted by an interrupt circuit 30 responsive to a signal from the power output control. The interrupt circuit 30 also acts through a jog circuit 31 to move the tool to or from working position.

A transistor fail-pulse loss control 33 is provided to safeguard the machine and work against damage due to electrical system failures. This receives inputs from the pulse generator, the relay control, and the power output control and acts through a shutdown control 34 to put the system on stand-by, shutting off delivery of power from the output control 15.

Figure 2:
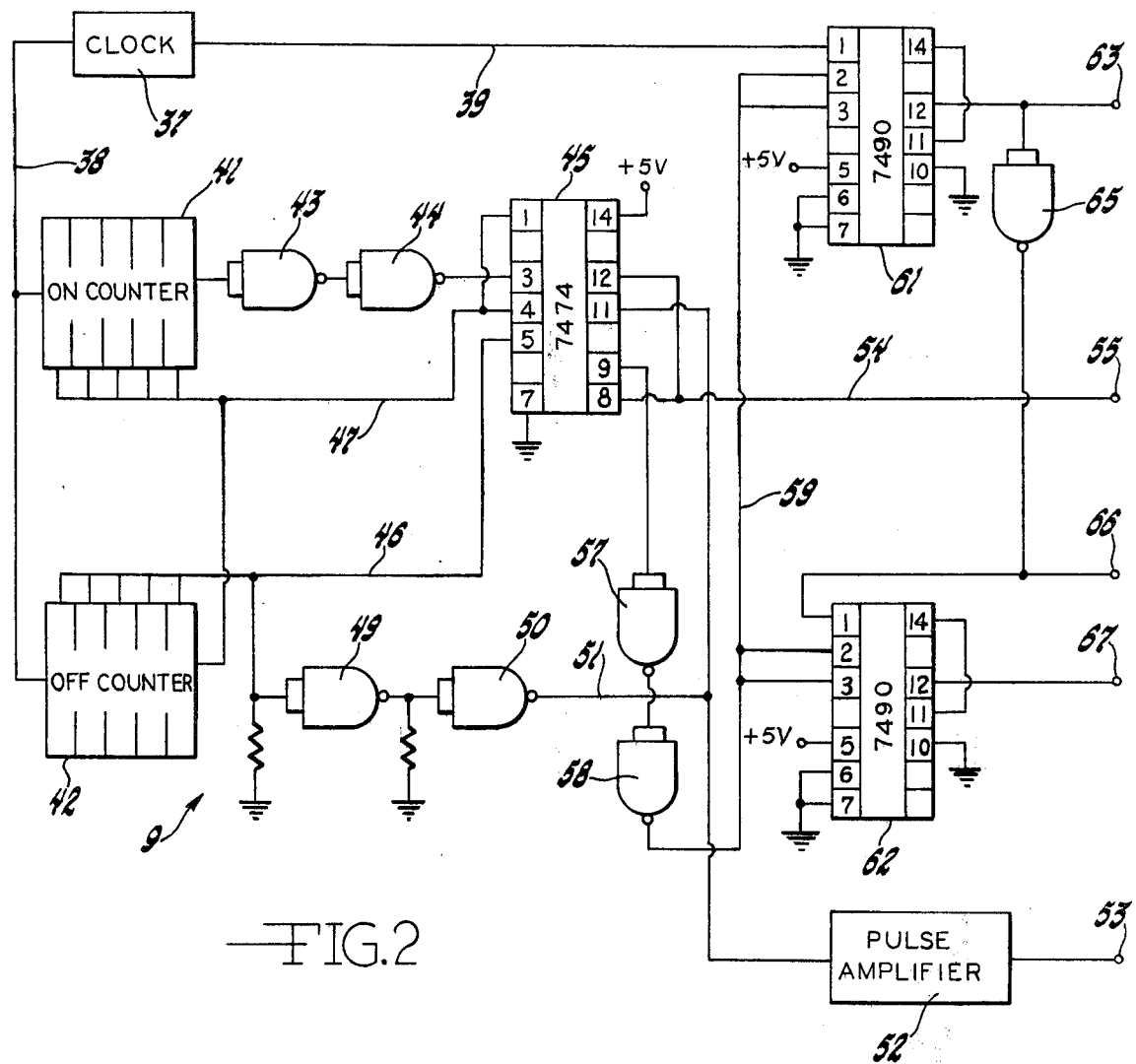
FIG. 2 is a schematic diagram of a pulse generator.

The Pulse Generator (FIG. 2)

The pulse generator 9 shown schematically in FIG. 2 includes a clock 37, which preferably comprises a 10 MHz crystal and a quadruple 2-input positive-NAND gate integrated circuit type 7400 connected in known fashion to deliver pulses at 10 MHz on output lines 38 and 39. Pulses on line 39 are inverted with respect to those on line 38. Line 38 supplies timing pulses to an "ON" counter 41 and an "OFF" counter 42. Each of these is a five decimal decade counter circuit comprising five integrated circuit synchronous up/down dual clock counters, BCD-coded with clear, type 74LS192. These are concatenated in known manner to provide counts up to 9999.9 microseconds. Each decade is settable by an individual BCD-coded thumbwheel switch to values 0 to 9. A visual readout (not illustrated) may be provided.

Counters 41 and 42 control respectively the "on" and "off" durations of the master pulse cycle, the sum of which is the master pulse period. They are coupled to a type 7474 integrated circuit 45 which embodies dual D-type positive-edge-triggered flip-flops with preset and clear. The "on" counter is coupled by two inverters (NAND gates) 43 and 44 to one flip-flop as illustrated to trigger one change of state. This provides a load/reset signal on line 46 to all decades of OFF counter 42. Counter 42 then counts to its preset number and delivers a pulse through line 47 to reset all decades of the ON counter 41. Line 47 also transmits a signal to the flip-flop 45 to reverse its state, which then remains stable until the completion of the "on" count.

The reset signal on line 46 also is fed through series inverters 49 and 50 to a line 51. The inputs to these inverters are grounded by 4.7 kilohm resistors. Line 51 delivers a master pulse signal through a pulse amplifier 52 to the master pulse output 53 of the pulse generator which is connected to various units of the EDM control. This master pulse defines the on and off durations of each cycle of the EDM power circuit.

Line 51 also provides an input as shown to the other flip-flop of circuit 45 which generates pulses which may be termed "composite" pulses triggered on and off by alternate cycles of the master pulse having on time equal to the period of the master pulse followed by off time of the same length. This composite pulse, used for control of the automatic relay select and control system, is delivered through line 54 to output terminal 55.

A second composite pulse output is delivered from integrated circuit 45 through inverters 57 and 58 in series and line 59 to integrated circuits 61 and 62. These are identical decade counters type 7490 which are wired to divide the input signal by ten. Counter 61 receives a 10 MHz clock signal (inverted) through line 39, and delivers a 1 MHz signal to terminal 63 and to an inverter 65. The inverted 1 MHz signal is fed to a terminal 66 and to counter 62. Counter 62 generates a 100 kHz signal fed to terminal 67. Terminals 55, 63, 66, and 67 are inputs to the automatic relay control, as will be seen. The composite pulse on line 59 fed to the counters 61 and 62 turns them on and off during alternate master pulse periods providing precise measured groups of output pulses for special counter circuits following.

The integrated circuit devices referred to above are standard types, available from Texas Instruments, Inc. and other sources. The connections to them are disclosed by the standard terminal numbers as used on the drawings, and therefore are not recited in the specification. Also, energizing connections (such as +5 V.) and grounds are shown but not further described. This policy favors conciseness and clarity of the description and will be followed hereunder.

Figure 5:
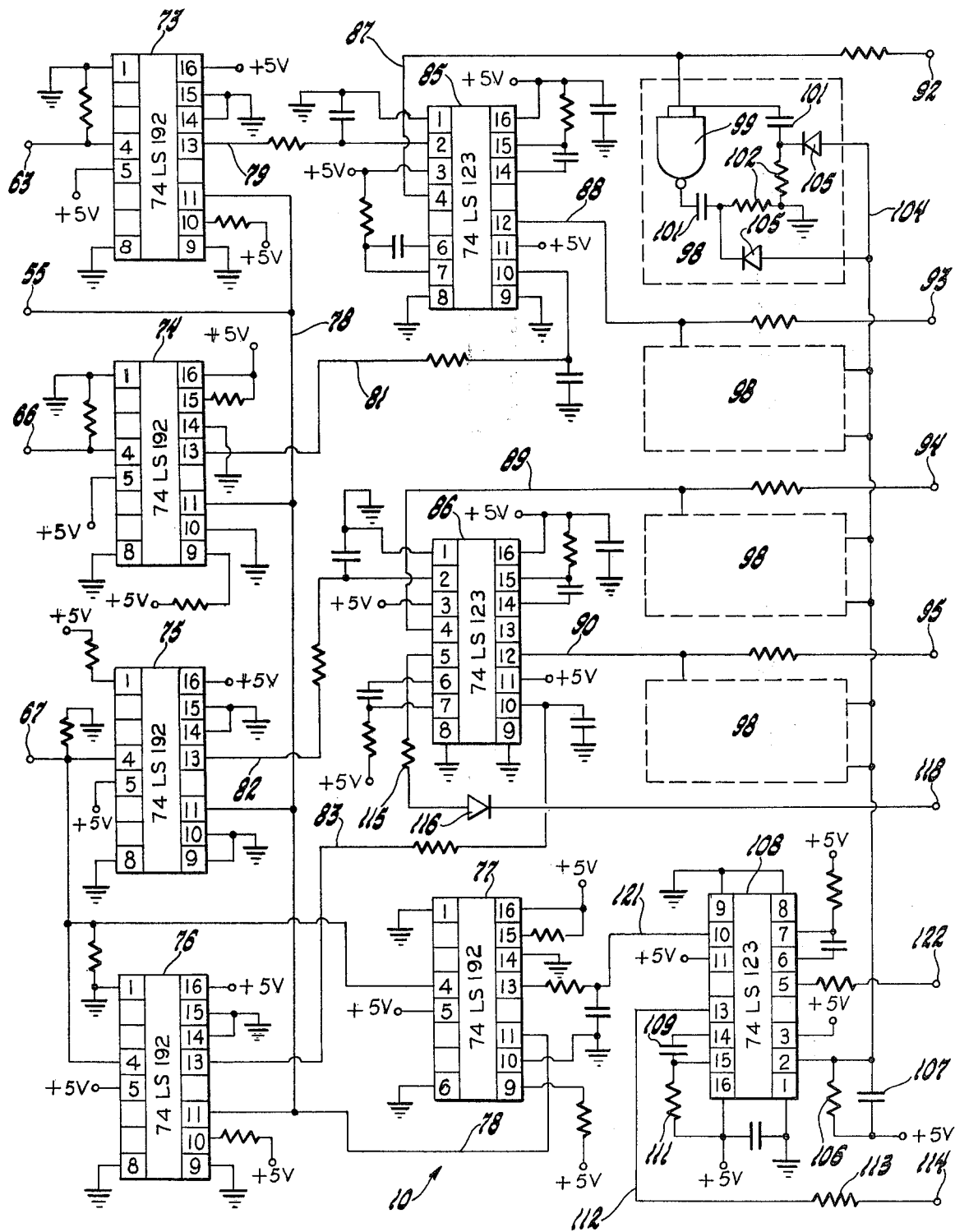
FIG. 5 is a schematic diagram of automatic relay control circuits.

The Automatic Relay Control Circuit (FIG. 5)

This portion of the system acts to vary current flow through power output transistors in the power output control 15 as a function of pulse period to provide proper operation and performance of these transistors. It suppresses power pulses for an interval whenever step changes are made in the resistor banks which control power output transistor current to allow time for the relays which effect these changes to operate. Also, it provides significant control inputs to the current cutoff control 27.

The automatic relay control circuit 10 is shown on FIG. 5. Input connections from the pulse generator 9 are identified as 1 MHz input 63, composite pulse input 55, 1 MHz inverted input 66, and 100 kHz input 67. The relay control circuit contributes signals to aid the operation of the cutoff control, as will be seen, but its primary function is to control the relay drivers 19 to vary machining power output in accordance with cycle timing.

The inputs to the automatic relay control 10 are initially conducted to five integrated circuit devices 73, 74, 75, 76, and 77. These are Type 74LS192 synchronous up/down dual clock counters, BCD-coded with clear. The composite pulse (one cycle for two master pulse cycles) is led through a bus 78 to all five. The 1 MHz input 63 is led to circuit 73, the 1 MHz inverted input 66 to circuit 74, and the 100 kHz input 67 to circuits 75, 76, and 77. These inputs are grounded through 10 kilohm resistors.

Counters 73 to 77 count the pulses supplied to them through inputs 63, 66, or 67, as the case may be, during the "on" portion of each composite pulse, which is the same as counting during alternate master pulse periods. The counting period is determined by the input through line 78. Counter 73 is set to count to four, counter 74 to 9, counter 75 to 2, counter 76 to 4 and counter 77 to 9. If the pulse period is too short, the counter provides no output. If the pulse period exceeds the counter setting, it delivers a negative-going pulse or spike on its output each time it reaches its set count.

Counters 73 and 74 count MHz pulses, the others count 100 kHz pulses. It would appear that they would count out in 4, 9, 20, 40, and 90 microseconds, respectively. However, due to the nature of the circuits, the actual values are slightly different, being found to be, in microseconds, 3.9 for counter 73, 9.4 for counter 74, 19.4 for counter 75, 39.4 for counter 76, and 89.4 for counter 77. These thresholds are quite critical and exact. A change of 0.1 microsecond in pulse period will drive the counter from no output to delivery of the output negative-going spike.

Obviously, the counters may be wired for other values if desired. To recapitulate, each counter counts the impulses fed to it during a master pulse period, counting during alternate master pulse periods in response to the composite pulse signal from bus 78. This input to the counters defines a time period equal to one master pulse period during which input pulses of 1 MHz or 100 kHz, as supplied, are counted. When the setting of any counter 73 to 77 is satisfied, it generates an output pulse or spike for further control.

The output lines from terminals 13 of these counters are normally positive. If we assume that the master pulse period is gradually increased from 2 microsec. at 3.9 microsec. counter 73 will respond to four 1 MHz frequency pulses by producing negative-going voltage spikes on its outlet line 79. Counter 74 is set to respond to 9 (inverted) 1 MHz frequency pulses and will drive its output to a momentary zero at 9.4 microsec. Counters 75, 76 and 77 are set to respond to pulses at 10 microsec. intervals with counts of two, four, and nine pulses approximately, to deliver output spikes at pulse periods over 19.4, 39.4, and 89.4 microsec., respectively.

The first four counters send their output signals over lines 79, 81, 82 and 83 to two integrated circuit devices 85 and 86. These are type 74LS123 dual retriggerable monostable multivibrators with clear. The devices 85 and 86 thus provide four multivibrators, one for each of the counters 73 to 76. All four multivibrators are similarly wired. Considering the counter 73 circuit, line 79 is connected through a 100 ohm resistor to terminal 2 of the device 85, which terminal is grounded through a 100 pF capacitor. Terminals 14 and 15 are connected by a 2.2 microfarad condenser, and 15 is connected to 16 through 47 kilohms. Terminal 16 is fed +5 V. and is grounded through 0.01 microfarad, and terminal 1 is grounded. Terminal 4 delivers the output through a line 87. The other half of circuit 85 and the two sections of circuit 86 are similarly connected. They provide outputs through lines 88, 89 and 90 in response, respectively, to the outputs from counters 74, 75, and 76. Lines 87 to 90 are positive when no signal is received from the associated counter (insufficient count, therefore too low pulse period). But when the critical time interval (3.9, 9.4, etc.) is exceeded, the negative spike from the counter drives the multivibrator to its non-stable condition, where it remains for a time based upon the RC circuit connected to terminals 14, 15, and 16. If this master pulse period persists, repeated spikes from the counter at each count-out hold the multivibrator in the astable condition. If the pulses on line 79, 81, 82 or 83 terminate because of lowered pulse period, the multivibrator returns to its stable condition. When the multivibrator is in the stable condition, its output line 87 to 90 is positive. When it changes state, the output is held negative. The potential on lines 87 to 90 is led through 330 ohm resistors to respective output terminals 92, 93, 94, and 95 which are connected to the relay drivers 19 (FIG. 1) to vary pulse energy level, as will be further explained.

The control system acts to interrupt machining pulses for 50 milliseconds whenever a change of state occurs at any of outputs 92 to 95. This allows time for relay actuation. Response to these changes is effected by a portion of circuit 10 which includes four identical change-responsive circuits 98, only one of which is diagrammed. The first circuit 98 comprises a NAND gate 99 connected to line 87 and acting as an inverter. The input and output of gate 99 are each connected through a 0.1 mfd capacitor 101 and a 100 kilohm resistor 102 to ground.

A bus 104 is connected through diodes 105 to the junctions between the resistors and capacitors. Bus 104 is energized from +5 V. through 22 kilohm resistor 106 and capacitor 107 in parallel. All the change-responsive circuits 98 are similarly connected to bus 104, and they have inputs from lines 87, 88, 89, and 90, respectively.

Obviously, in steady-state conditions on lines 87 to 90, one terminal of inverter 99 will be at zero and the other at plus, which is about 3 volts. If the condition of the input reverses, so does the output of inverter 99.

During steady state, the potential on bus 104 is determined by the IR drop from 5 V input through resistor 106 and the IR drop through the eight parallel circuits through the diodes 105 and resistors 102 of circuits 98 to ground. This potential is positive and provides a positive input to one astable multivibrator (MV) in an integrated circuit 108 of type 74LS123. This inputs holds the MV in its stable condition. Capacitors 101 and 107 are charged.

Now, if any of the output lines changes state, the input or output of inverter 99, whichever was plus, becomes zero. The corresponding capacitor 101 drives the junction of capacitor 101, resistor 102, and diode 105 negative, causing temporary current flow from bus 104 as capacitor 101 discharges and recharges in the opposite direction. This current flow creates a drop in resistor 106 which provides a negative-going voltage spike on bus 104 to trigger the MV.

Thus, each time a line 87 to 90 changes state, the MV is driven to change state. This change of state persists for a time determined by a capacitor 109 and a resistor 111. It is preferred that the time be 50 milliseconds. A 4.7 mfd capacitor and 33 kilohm resistor will set this time value. Each time the MV is triggered, it delivers a 50 millisec. pulse on line 112 through resistor 113 to terminal 114, which is connected to the pulse amplifier 11 to interrupt the transmission of master pulses to the power output control.

Integrated circuit 86 delivers a second signal to indicate pulse period above or below 39.4 microseconds to the current cutoff control 27. This signal is taken from the MV through a resistor 115 and a diode 116 to an output terminal 118.

A signal of pulse period of 89.4 microsecond or over is generated by the counter 77 and one MV of circuit 108, similarly to the generation of the other pulse duration signals referred to above. The counter is connected to the MV through line 121, and the MV to output terminal 122 through a 470 ohm resistor. This signal also goes to the current cutoff circuit.

Figure 3:
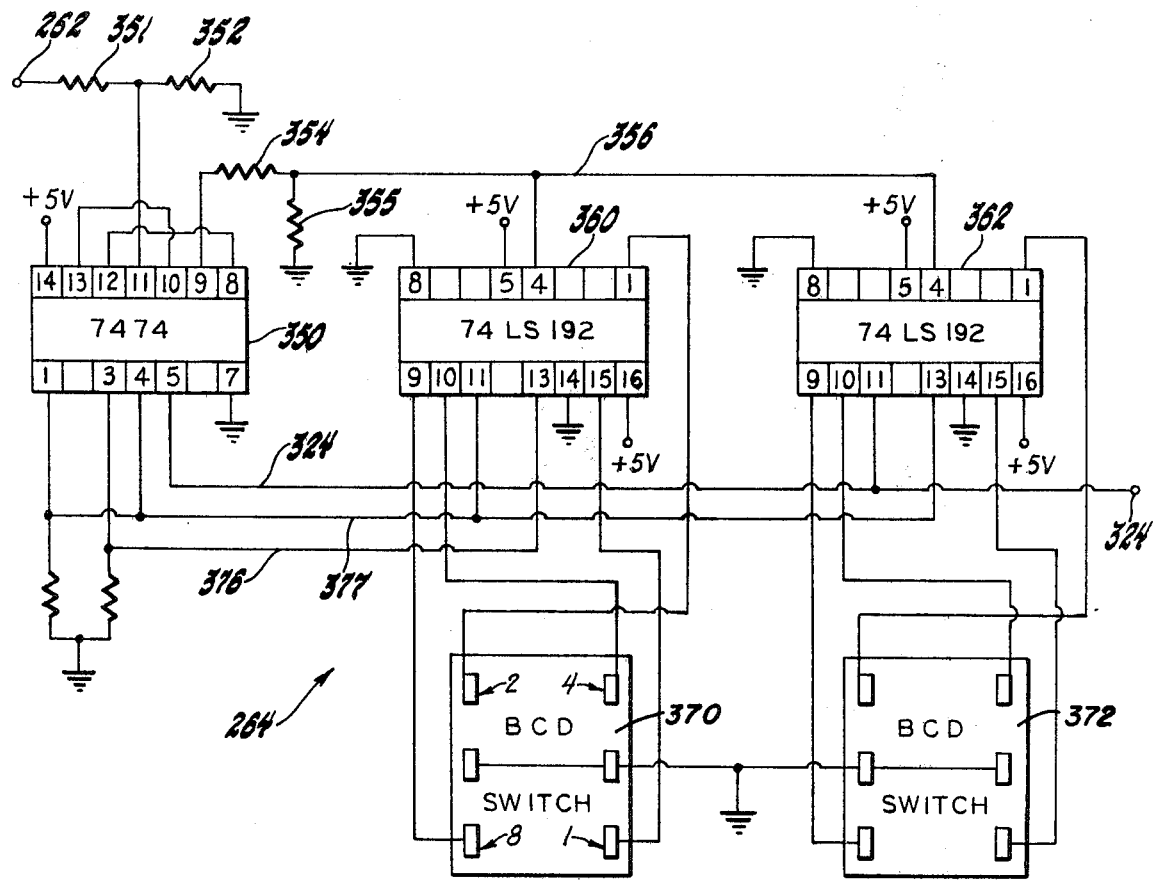
FIG. 3 is a schematic diagram of a probe pulse bunching control.
Figure 4:
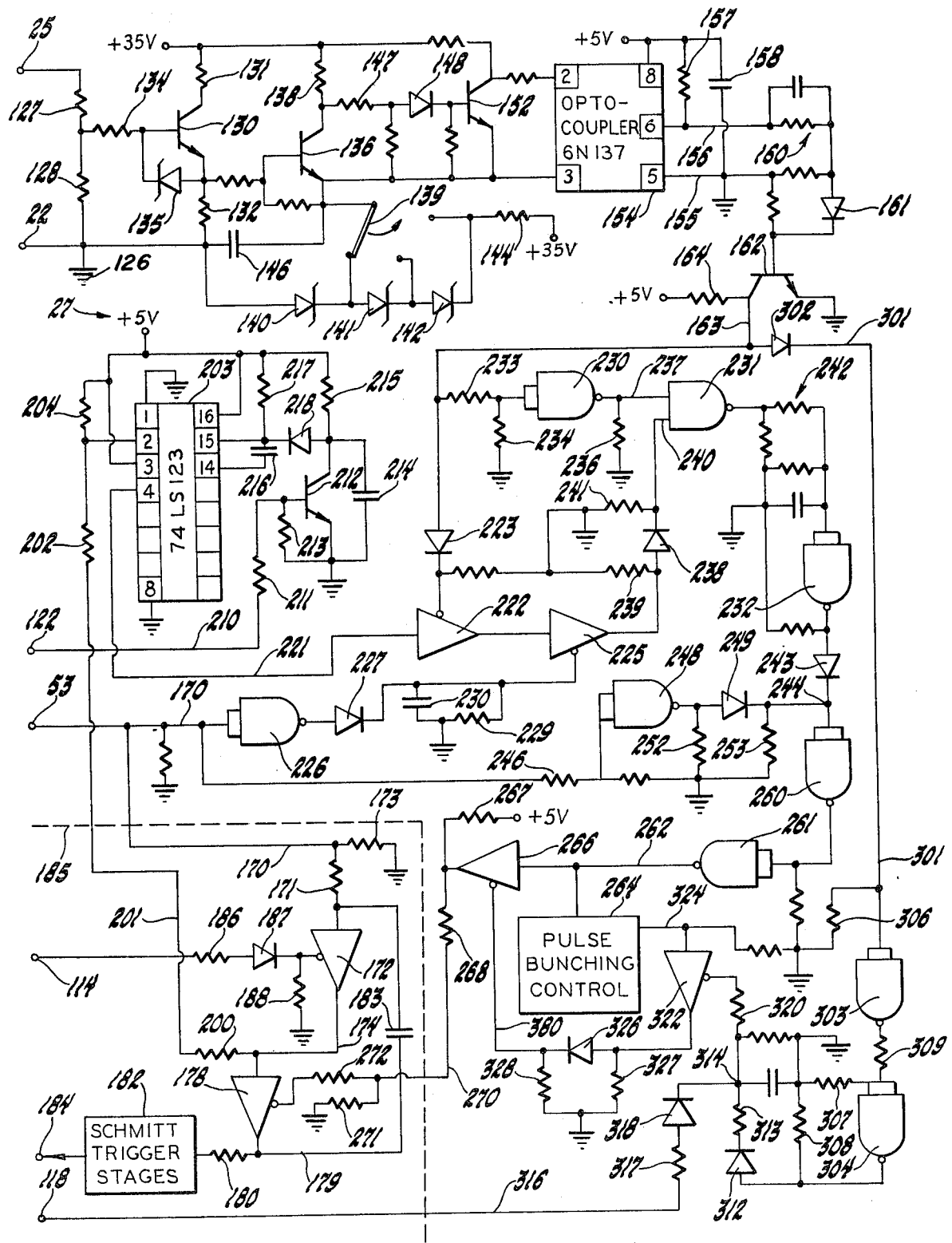
FIG. 4 is a schematic diagram of the current cutoff control and a pulse amplifier.

The Current Cutoff Control (FIGS. 3 and 4)

The current cutoff control 27 is the part of the system that reacts to abnormal gap conditions. Referring to FIG. 4, the control receives an input of potentials at the workpiece and at the tool, the difference being the emf across the gap. As illustrated in FIG. 1, the workpiece is the negative, the tool is positive. The positive potential is led through line 23, the servo control 26, and line 25. The negative potential is conducted through line 22. The polarity of the gap may be reversed, in which case the connections to leads 22 and 23 will be reversed. The preferred level of open-circuit gap emf is 100 volts.

Leads 25 and 22 (upper left of FIG. 4) enter a discriminator circuit which responds to abnormally low voltage across the gap 21. Lead 22 is connected to a floating ground 126, to which lead 25 is connected through a voltage divider 127, 128. A transistor 130 connected as an emitter follower converts the level of the signal from the voltage divider. A plus 35 volt D.C. supply (referenced to ground 126) is connected through 22 ohm resistor 131, the collector-emitter circuit of the transistor, and a 4.7 kilohm resistor 132 to the floating ground. The base is supplied through a 3.3 kilohm resistor 134. A five-volt-drop Zener diode 135 limits base-emitter drop.

A transistor 136 serves as a signal amplifier and a threshold sensing or discriminating stage. The base of this transistor is resistance-coupled to its emitter and to the emitter of transistor 130. The collector of transistor 136 is fed from 35 V. through a load resistor 138. The emitter is connected to a voltage level selector switch 139 having three fixed contacts. These are connected as shown to Zener diodes 140, 141, and 142 which are in a series circuit from the floating ground through a resistor 144 to the 35 V. supply. The breakdown voltages of these diodes are approximately 5, 5, and 7½ volts, respectively, so that the emitter may be held at 5, 10, or 17½ volts. A filtering capacitor 146 is connected between the emitter and ground.

The circuit of transistor 136 and the Zener diodes acts to detect abnormally low gap voltage. There is a normal breakdown or discharge voltage level across the gap, which is considerably lower than the 100 volts peak gap emf. The level of this breakdown voltage depends upon the tool and workpiece materials and polarity. If the gap voltage falls below the breakdown voltage during the "on" time of power supply to the gap, an abnormal condition such as a full or partial gap short circuit is indicated. This may be due to chips accumulating in the gap, as already stated. The switch 139 permits selection of any one of three threshold levels for transistor 136. If the input to the base falls below this level, the transistor ceases to conduct. This causes a rise in potential at the collector, which is transmitted through a resistor 147 and diode 148 to the base of transistor 152 which is a signal amplifier. The emitter of transistor 152 is directly connected to that of transistor 136 and to the reference voltage established at switch 139. Its collector is energized from +35 V. through a 1 kilohm resistor.

The collector-emitter emf of transistor 152 is the output to an opto-coupler 154 type 6N137, available from Hewlett-Packard. This is inserted into the circuit to isolate electrically the discriminator circuit just described from the logic circuits to be described. It comprises a photon emitting diode energized by the input, a photodiode responsive to the photon output, and an integrated linear amplifier. It, and the logic circuits to be described, are energized from a 5 V. D.C. source. Line 155 of the output is grounded, and line 156 is supplied from 5 V. through a resistor 157 grounded through a capacitor 158, as recommended. The opto-coupler is capable of responding to high frequency inputs. A fast response is required, since the pulse frequency may be as high as 833 kilocycles in the preferred embodiment of this invention. The discriminator circuit has a sufficiently rapid response to transmit a signal indicative of low gap emf during the "on" time of one such cycle.

The output from the opto-coupler proceeds through a filter circuit 160 and a diode 161 to the base of a transistor 162. This transistor serves to reduce noise and amplify the signal for introduction into the logic system. The logic system has two states, a positive emf of about 3 volts, and a low emf near zero. In the subsequent discussion, these will be referred to as high and low levels or states, respectively. As an example, the emf on output line 163 from transistor 162 is near 3 volts (high) when the transistor is non-conducting, but is dropped to the low level by resistor 164 when the transistor is turned on by a positive input to its base. The potential on line 163 is normally high during a machining pulse and swings to low when the discriminator circuit responds to undervoltage at gap 21.

The current cutoff control monitors transmission of pulses from the pulse generator 9 (FIG. 1) through the pulse amplifier 11 and thus through the pulse drivers 13 to the power output control 15 which delivers the power pulses to the gap 21. The master pulse output terminal 53 of the pulse generator is shown as input 53 in FIG. 4. The master pulse is conducted through line 170 and resistor 171 to a gate 172. Line 170 is grounded through 22 kilohm resistor 173. Gate 172 normally conducts and passes the master pulse through a line 174 to a second gate 178, which is normally conducting. The outpt line 179 of this gate is connected through a resistor 180 to Schmitt trigger stages indicated at 182 and through a 200 pF capacitor 183 to the input of gate 172. The Schmitt stages amplify the master pulse and provide a sharp leading edge to trigger the pulse drivers 13, which requires considerable power. The output of the Schmitt trigger stages is indicated as 184 on FIGS. 4 and 6. The dotted line 185 indicates that the circuits below and to the left of this line are considered as elements of the pulse amplifier 11.

Gate 172 interrupts transmission of master pulses in response to high potential on terminal 114 generated by the relay control circuit described above. This high potential persists for 50 milliseconds upon any pulse period change calling for power controlling relay action. The high signal is transmitted from terminal 114 through a resistor 186 and diode 187 to the control terminal of gate 172, which is grounded through resistor 188. A high signal on this terminal blocks transmission of the master pulse and thus shuts off the machining pulses for 50 milliseconds.

Considering now the operation of the current cutoff control to effect transmission of reduced energy level machining pulses in response to low gap emf, we term these pulses "probe pulses". The reason for this is that these reduced strength pulses continue operation of the machine at a reduced energy level to probe or test for termination of the abnormal gap condition, while reducing gap energy level to safeguard against damage to the tool or workpiece.

The output 174 of gate 172 is connected through resistor 200, line 201, and resistor 202 to a triggering input of monostable multivibrator 203 type 74LS123, which is the probe pulse generator. This input is also energized from the 5 volt supply through 10 kilohm resistor 204. This input is thus high when line 201 is high and low when 201 is low. In the normal transmitting condition of gate 172, the multivibrator 203 thus receives the master pulse. It acts to generate a probe pulse which turns on synchronously with the master pulse but is of relatively short duration.

The probe pulse generator is controllable to provide pulses of about 9 microseconds or about 2 microseconds "on" time. The longer probe pulse is used when the machine is set for long master pulse periods. Input 122 from the automatic relay control 10 is high when master pulse period is over 89.4 microseconds, otherwise low. This input is conducted through line 210 and resistor 211 to the base of transistor 212, which is grounded through resistor 213. The emitter is grounded and connected through 100 pF capacitor 214 to the collector, which is energized from +5 V. through a resistor 215.

The "on" time of pulse generator 203 is determined by an RC circuit including capacitor 216 and resistor 217 to deliver the long pulse. When the master pulse time is over 89.4 microseconds, the high signal on the base of transistor 212 drives its collector near zero so that diode 218 blocks resistor 215 out of the timing RC circuit. When the input is low, current may flow from +5 V. through resistors 215 and 217 in parallel. This reduces the effective resistance by a factor of about 5, shortening the probe pulse "on" time accordingly.

The probe pulses are delivered from multivibrator 203 through line 221 into a gate 222. These pulses are inverted—they are low during the probe pulse "on" period. Gate 222 is controlled by an input from line 163 through a diode 223. When gap voltage is above the preset threshold, line 163 is high during the "on" pulse time and gate 222 blocks transmission of probe pulses.

Further control of the probe pulses is effected by a gate 225 in series with gate 222. This gate has a control electrode energized from the master pulse 170 through an inverter 226 defined by a two-input positive-NAND gate circuit 7400 and a diode 227. Resistor 229 and capacitor 230 filter the input to gate 225. This gate therefore cuts off the probe pulse at the end of the "on" time of the master pulse. The probe pulse "on" time therefore cannot be longer than the master pulse. This limits the probe pulse "on" time to that of the master pulse whenever that is less than the lower value set by an under 89.4 microsecond input at input 122.

A branch of discriminator output line 163 enters a series circuit of three 2-input Schmitt triggers 230, 231, and 232. The input to trigger 230 is fed through resistor 233 and grounded by resistor 234. This is connected as an inverter and acts also to improve the signal. The output of trigger 230 is grounded by resistor 236 and fed to one input 237 of trigger 231. The other input to 231 comes from the output of gate 225 through a diode 238 and past grounding resistors 239 and 241 to input 240. Schmitt trigger 231 is a NAND gate and therefore provides a high output unless both inputs are high. The input at 237 is high when gap voltage is low during the master pulse "on" period. The input at 240 is high during the "off" time of the probe pulse (the probe pulse signal being inverted).

The output of gate 231 passes through a filter circuit 242 to gate 232, connected as an inverter, and a diode 243 to a junction 244. The master pulse is also fed to this junction from line 170 through a 100 ohm resistor 246, a Schmitt trigger inverter 248, and a diode 249. Resistances 251, 252, and 253 connected to ground are of 10, 4.7 and 0.47 kilohms, respectively. Because of diodes 243 and 249, a high signal may flow from either circuit into junction 244, but not a low signal. Junction 244 is thus high during the off time of the master pulse and during the off time of the probe pulse.

The signal at junction 244 proceeds through inverters 260 and 261 in series, which improve the quality of the signal. This is then fed through line 262 to a pulse bunching control 264 to be described and to the input of a three-state gate 266 type 74LS125. The output of this gate is connected to +5 V. through a one kilohm resistor 267 and through a 100 ohm resistor 268 to a line 270 providing a control input to three-state gate 178 in the pulse amplifier circuit, already referred to. Line 270 is grounded by a 470 ohm resistor 271 and connects to the gate through a 22 ohm resistor 272.

Gate 178 serves to interrupt the passage of pulses to the trigger stages 182 so that the probe pulses are transmitted intermittently to reduce energy dissipation at gap 21 during short circuit conditions. Considering now the circuits controlling this mode of operation, a line 301 is energized from line 163 through a diode 302 and is thus high during machining pulses which are over the voltage threshold. This line is connected through two inverters 303 and 304 for signal improvement and isolation. The grounded resistors 306, 307, and 308 are 2.2, 1, and 1 kilohm, respectively. Resistor 309 is 100 ohms. After the two inversions, the gap signal is fed through a diode 312 and 22 ohm resistor 313 to a junction 314. If the gap potential is above the threshold, this diode is forward biased.

Junction 314 also receives a signal, positive when master pulse period is 39.4 microsec. or more, from terminal 118 of the relay control circuits through line 316, 47 ohm resistor 317, and diode 318. Thus this junction is positive when gap voltage is correct or master pulse period is 39.4 microsec. or more. It is connected through 22 ohm resistor 320 to the control input of a gate 322. This connection has RC filtering.

Gate 322 is energized from the output 324 of a pulse bunching control 264 and acts to pass or block a signal causing periodic interruption of the probe pulses. When its control input is positive, it blocks transmission of positive signals from line 324 to the control input of gate 266. This circuit passes through a diode 326, the terminals of which are grounded by a 2.2 kilohm resistor 327 and a 470 ohm resistor 328.

Refer now to FIG. 3 for the pulse bunching control 264. As previously stated, this provides for delivering probe pulses intermittently to reduce heating of the workpiece. It includes adjustable counters by which the number of pulses in a continuous series or bunch may be set at any even number from 2 to 20, and the number of pulses skipped between the series may be varied from zero to 18 in even numbers. Of course, if this setting is zero, the pulse flow is uninterrupted.

Line 262 provides input signals to a type 7474 integrated circuit 350 which contains dual D-type positive-edge-triggered flip-flops with preset and clear. This input is derived from the master pulse, as explained above. It is supplied through a 100 ohm resistor 351 to a clock input of 350, which is grounded by a 1 kilohm resistor 352. The positive output of one flip-flop is connected through resistor 354 (470 ohm) past 4.7 kilohm grounding resistor 355 through line 356 to the "count down" inputs of two integrated circuit counters 360 and 362. These are type 74LS192, already referred to in the pulse generator circuit 9.

The numerical settings of the counters are controlled by binary coded decimal switches 370 and 372. The terminal indicated as "1" on the switch is grounded on all even numbers; terminal "2" on 0, 1, 4, 5, 8, and 9; terminal "4" on 0 to 3, 8, and 9; and terminal "8" on Nos. 0 to 7. These thus represent a number, as, for example, 0101 represents 5, or 1000 represents 8. The switches are connected to the counters 360 and 362 as indicated.

Switches 370 and 372 have shafts operable by a screwdriver to set in numbers from 0 to 9, which are doubled in the counting circuit. Thus, for example, the pulse bunching control might be set to count four probe pulses, then squelch the next eight, and continue to repeat this cycle.

Note that counters 360 and 362 return signals to flip-flop 350 through lines 376 and 377, respectively, these lines being grounded through 10 kilohm resistors. Line 377 also feeds into counter 360. The output from this pulse bunching control is through line 324.

Referring to FIG. 4, line 324 delivers the bunched pulse signal through gate 322 (unless master pulse period is 39.4 microseconds or higher) and through line 380 to the control input of gate 226. At gate 266, a high signal representing the empty period of probe pulses interrupts transmission of probe pulses to the pulse amplifier 11.

To recapitulate, probe pulses are transmitted only when machining gap conditions are abnormal. They may not have a longer pulse duration than the master pulse, but otherwise are about 2 microsec. duration unless master period exceeds 89.4 microsec., in which case probe pulse duration becomes about 9 microsec. If the master pulse duration is less than 39.4 microseconds, the probe pulses normally are bunched as described.

Figure 6:
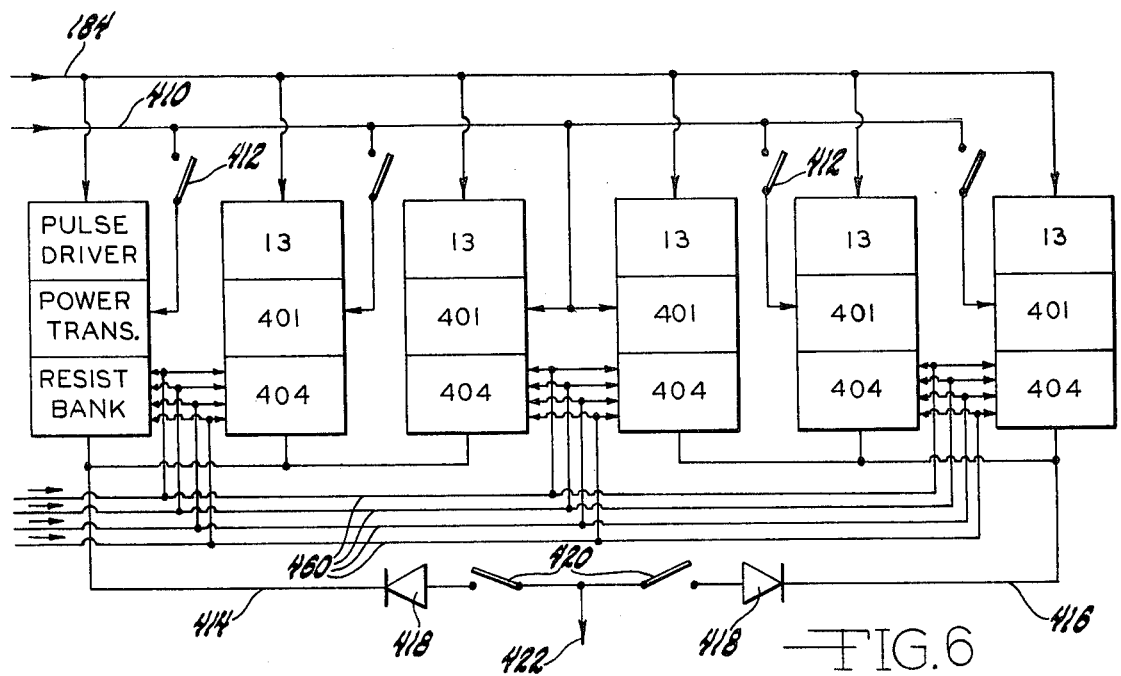
FIG. 6 is a block diagram of a power output control system.
Figure 7:
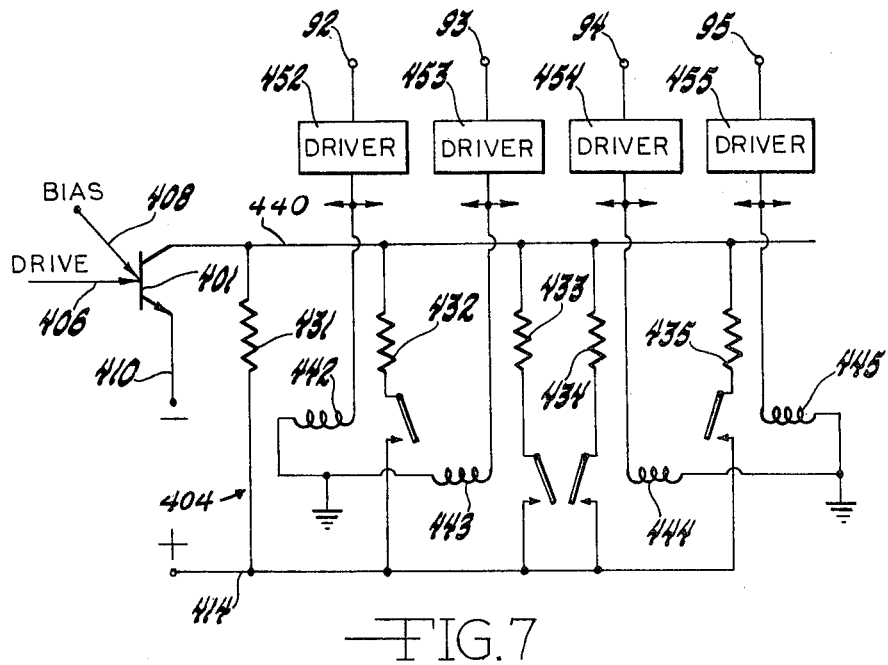
FIG. 7 is a schematic diagram of the power level control of a power output transistor.

The Power Output Control (FIGS. 6 and 7)

FIGS. 6 and 7 illustrate the interactions of the pulse drivers 13, the relay drivers 19, and the power output control 15 to control the energy level at the machining gap in response to signals from the automatic relay control 10, pulse amplifier 11, and current cutoff control 27.

In the preferred embodiment, the power output control includes six power transistors 401 which switch the current to the gap on and off in responses to a drive signal from the pulse drivers 13. There is a driver 13 for each transistor 401. The transistors 401 are connected in parallel, and any number may be used, depending upon the power level desired.

Further, the current through each power transistor is limited by a variable resistance bank 404 in series with the transistor. This also varies the gap energy, but the limitation of transistor current is necessary to prevent overheating and destruction of the power transistors. The allowable current level becomes lower as pulse frequency increases.

Referring to FIG. 6, the amplified master pulse signal from the pulse amplifier on line 184 is supplied to a pulse driver 13 for each power transistor 401 to provide the power input to the base of the transistor through a line 406 (FIG. 7). The base is suitably biased by means not detailed here, as indicated at 408.

Power is supplied to each transistor 401 from a negative bus 410. Switches 412 control transmission of power. The power transistors are in two groups, connected respectively through buses 414 and 416, blocking diodes 418, and switches 420 to a positive bus 422. Switches 420 permit use of either or both groups of transistors, and switches 412 provide for selection of one or more transistors in each group. These may be remote-controlled switches.

Referring to FIG. 7, each resistance bank 404 comprises five resistors 431, 432, 433, 434, and 435 connected in parallel between a positive bus 414 (or 416) and a bus 440 leading to the collector of transistor 401. These resistors are 50 ohms non-inductive, except 435 is 3 of 50 ohms in parallel. The circuits through resistors 432 to 435 are closed by normally open relays 442 to 445. The relay coils are energized by relay drivers 452 to 455, respectively, which are elements of the relay driver circuits 19 (FIG. 1). The relay driver circuits include conventional electronic amplifier means (not illustrated) by which the outputs 92, 93, 94, and 95 of the relay control circuits 10 are coupled to the relay coils. It will be seen that relay 442 closes at 3.9 microseconds, relay 443 at 9.4, relay 444 at 19.4, and relay 445 at 39.4 in this specific example. Each driver 452 to 455 controls the corresponding relay of all the resistor banks 404. The several leads from the relay drivers to the resistance banks are indicated at 460 in FIG. 6.

Conclusion

The advantages of the control system described above will be apparent to those skilled in the EDM art, particularly those derived from the improved automatic relay control and the improved current cutoff control, and from the interaction of these two portions of the control system.

I claim:

1. A power supply system for electric discharge machining comprising, in combination, power control means effective to transmit electric power in periodic pulses from a source through an electrode and a workpiece characterized by means responsive to the period of the power pulses effective to vary the energy level of the power pulses over a range of working levels as a function of the said period, and means responsive to such variation of power pulse energy level effective to interrupt the operation of the power pulse transmitting means for a predetermined time to provide time for stabilization of the power pulse transmitting means upon a change in power pulse energy level.

2. A system as defined in claim 1 including means establishing discrete energy levels of the power pulses responsive to predetermined ranges of the pulse period, with step changes between the energy levels, and in which the means for interrupting the operation of the power pulse transmitting means is actuated in response to variation of the pulse period from one to another of said ranges.

3. A power supply system for electric discharge machining comprising, in combination, power control means effective to transmit electric power in periodic pulses from a source through an electrode and a workpiece; means for generating a pulsating control emf including means for varying the period of the emf pulses; and means responsive to the control emf pulses effective to trigger the power pulses; characterized by means responsive to the period of the control emf pulses effective to vary the energy level of the power pulses over a range of working levels as a function of the said period, and means responsive to variation of the period of the control emf pulses effective to interrupt the operation of the power pulse transmitting means for a predetermined time to provide time for stabilization of the power pulse transmitting means upon a change in power pulse energy level.

4. A system as defined in claim 3 including means establishing discrete energy levels of the power pulses responsive to predetermined ranges of the pulse period, with step changes between the energy levels, and in which the means for interrupting the operation of the power pulse transmitting means is actuated in response to variation of the pulse period from one to another of said ranges.

* * * * *

UNITED STATES PATENT AND TRADEMARK OFFICE
CERTIFICATE OF CORRECTION

PATENT NO. : 4,443,681

DATED : April 17, 1984

INVENTOR(S) : Robert W. Drushel et al.

It is certified that error appears in the above-identified patent and that said Letters Patent is hereby corrected as shown below:

IN THE SPECIFICATION:

Column 10, line 33, delete "226" and insert --266--.

Signed and Sealed this

Twentieth Day of December, 1988

Attest:

DONALD J. QUIGG

*Attesting Officer*  *Commissioner of Patents and Trademarks*